(12) United States Patent
Schnauffer

(10) Patent No.: US 10,894,579 B2
(45) Date of Patent: Jan. 19, 2021

(54) WATERCRAFT HAVING MOVEABLE HYDROFOILS

(71) Applicant: Peter Schnauffer, Oberderdingen (DE)

(72) Inventor: Peter Schnauffer, Oberderdingen (DE)

( * ) Notice: Subject to any disclaimer, the term of this patent is extended or adjusted under 35 U.S.C. 154(b) by 0 days.

(21) Appl. No.: 15/305,920

(22) PCT Filed: Apr. 7, 2015

(86) PCT No.: PCT/EP2015/057473
§ 371 (c)(1),
(2) Date: Oct. 21, 2016

(87) PCT Pub. No.: WO2015/162000
PCT Pub. Date: Oct. 29, 2015

(65) Prior Publication Data
US 2017/0036739 A1    Feb. 9, 2017

(30) Foreign Application Priority Data
Apr. 25, 2014    (DE) .................. 10 2014 105 883

(51) Int. Cl.
  *B63B 1/16*    (2006.01)
  *B63B 1/28*    (2006.01)
  (Continued)

(52) U.S. Cl.
CPC .............. *B63B 1/28* (2013.01); *B63B 1/26* (2013.01); *B63H 20/06* (2013.01); *B63H 20/106* (2013.01); *B63B 1/30* (2013.01); *B63B 2001/281* (2013.01)

(58) Field of Classification Search
CPC .. B63B 1/24; B63B 1/242; B63B 1/26; B63B 1/28; B63B 2001/281; B63B 1/283;
(Continued)

(56) References Cited

U.S. PATENT DOCUMENTS 2,984,197 A * 5/1961 Bader .................. B63B 1/30
                                                                114/282
3,137,260 A * 6/1964 Harris, Jr. ........... B63B 1/286
                                                                114/275
(Continued)

FOREIGN PATENT DOCUMENTS

CN    101712372 A    5/2010
CN    101712372 A    5/2010
(Continued)

OTHER PUBLICATIONS

Office Action issued in connection with Chinese Patent Application No. 201580022058.9 dated Nov. 3, 2017.
(Continued)

*Primary Examiner* — Andrew Polay
(74) *Attorney, Agent, or Firm* — Steven M. Shape; Dennemeyer & Associates, LLC

(57) ABSTRACT

The invention relates to a watercraft having a hull (10) which has a hydrofoil assembly (20) in the region of the stern (12) and another hydrofoil assembly (30) in the region of the bow (11), the hydrofoil assemblies (20, 30) each having hydrofoils (21, 31) arranged on both sides of the hull (10). To achieve a stable position in the water while ensuring good driving dynamics under a wide range of conditions, according to the invention the hydrofoil assemblies (20, 30) are coupled to at least one adjustment unit (22, 32) such that the bow-side hydrofoil assembly (20) and the stern-side hydrofoil assembly can each be at least partially individually height adjustable (FIG. 1).

22 Claims, 13 Drawing Sheets

(51) Int. Cl.
  *B63B 1/26* (2006.01)
  *B63H 20/10* (2006.01)
  *B63H 20/06* (2006.01)
  *B63B 1/30* (2006.01)

(58) Field of Classification Search
  CPC ......... B63B 1/285; B63B 1/286; B63B 1/288; B63B 1/30
  See application file for complete search history.

(56) References Cited

U.S. PATENT DOCUMENTS

| | | | |
|---|---|---|---|
| 3,150,626 A | | 9/1964 | Irgens |
| 3,236,202 A | | 2/1966 | Quady |
| 3,354,857 A | | 11/1967 | Hobday |
| 3,456,611 A | * | 7/1969 | Johnson .................... B63B 1/30 |
| | | | 114/275 |
| 3,623,444 A | * | 11/1971 | Lang ........................ B63B 1/107 |
| | | | 114/277 |
| 4,159,690 A | * | 7/1979 | Farris .................... G05D 1/0875 |
| | | | 114/275 |
| 5,054,410 A | | 10/1991 | Scarborough |
| 5,117,776 A | | 6/1992 | Thorpe |
| 5,329,870 A | | 7/1994 | Cook |
| 5,653,189 A | | 8/1997 | Payne |
| 6,012,408 A | | 1/2000 | Castillo |
| 7,743,720 B1 | | 6/2010 | Salani |
| 8,201,514 B2 | | 6/2012 | Coles |
| 2007/0114327 A1 | * | 5/2007 | Dees ........................ B64C 9/323 |
| | | | 244/34 R |
| 2008/0305698 A1 | * | 12/2008 | Rosiello .................... B63B 1/24 |
| | | | 441/79 |

FOREIGN PATENT DOCUMENTS

| | | | | |
|---|---|---|---|---|
| CN | 102501958 A | | 6/2012 | |
| CN | 103318378 A | | 9/2013 | |
| DE | 19752170 A1 | | 10/1999 | |
| FR | 2464176 A1 | * | 3/1981 | ............. B63B 1/30 |
| JP | 59-190082 A | | 10/1984 | |
| JP | 1994040382 A | | 8/1995 | |
| JP | UMH5-053608 A | | 8/2012 | |

OTHER PUBLICATIONS

International Search Report issued in connection with PCT Application No. PCT/EP2015/057473 dated Oct. 29, 2015.
Office Action and Search Report issued for Russian application No. RU 2016141635/11 dated Oct. 19, 2018.
Examination Report issued for Australian application No. 2015251117 dated Mar. 22, 2018.
Office Action issued in connection with Japanese Patent Application No. 2016-563927 dated Apr. 16, 2019.

* cited by examiner

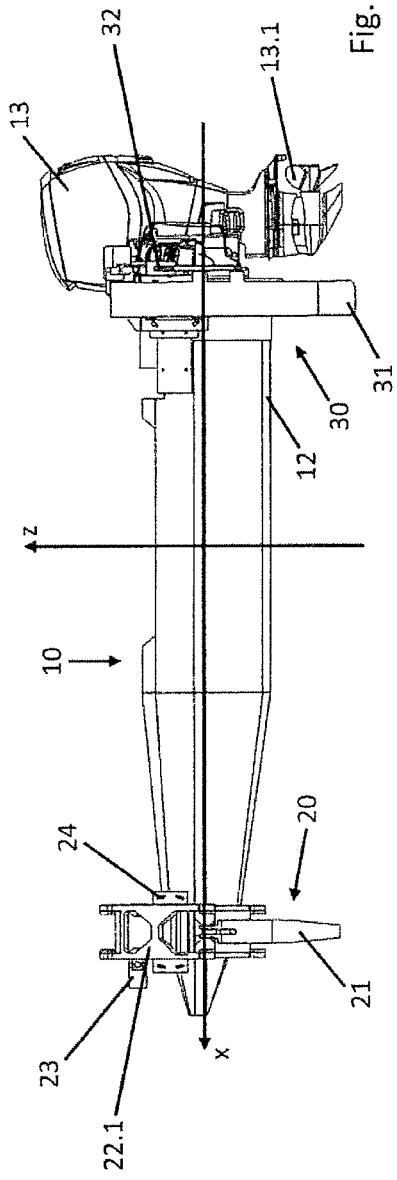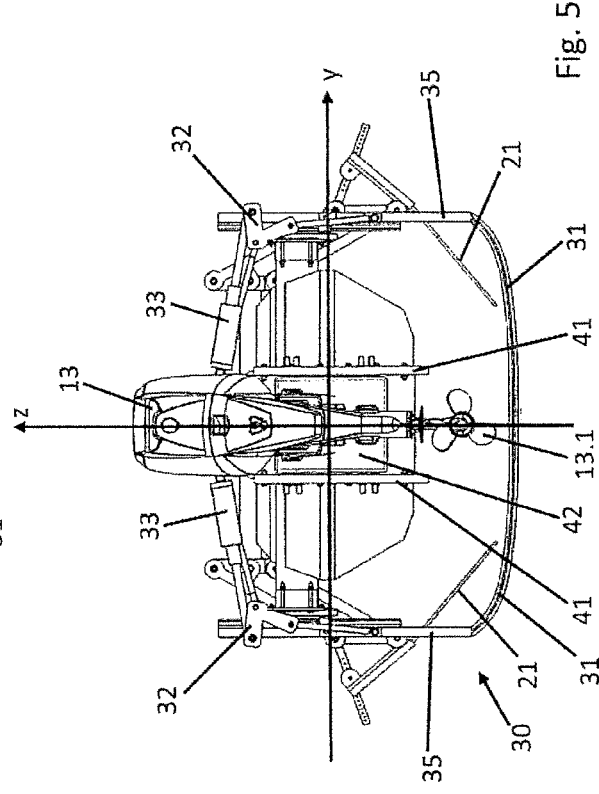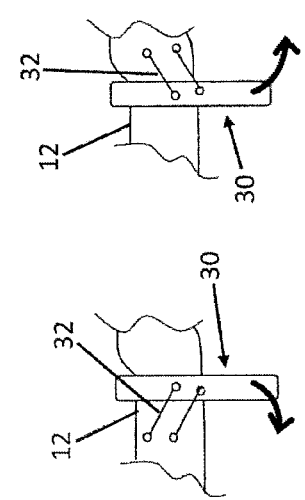

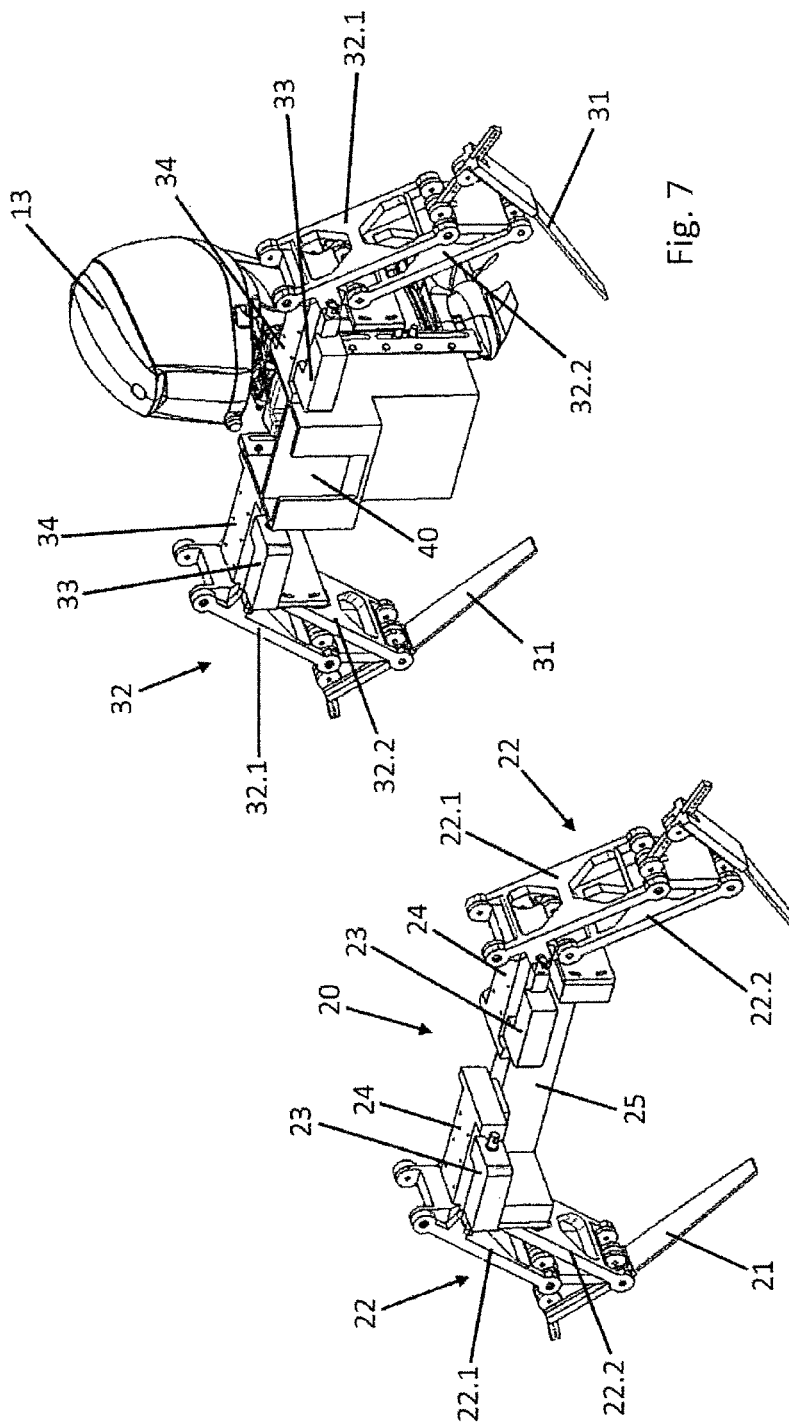

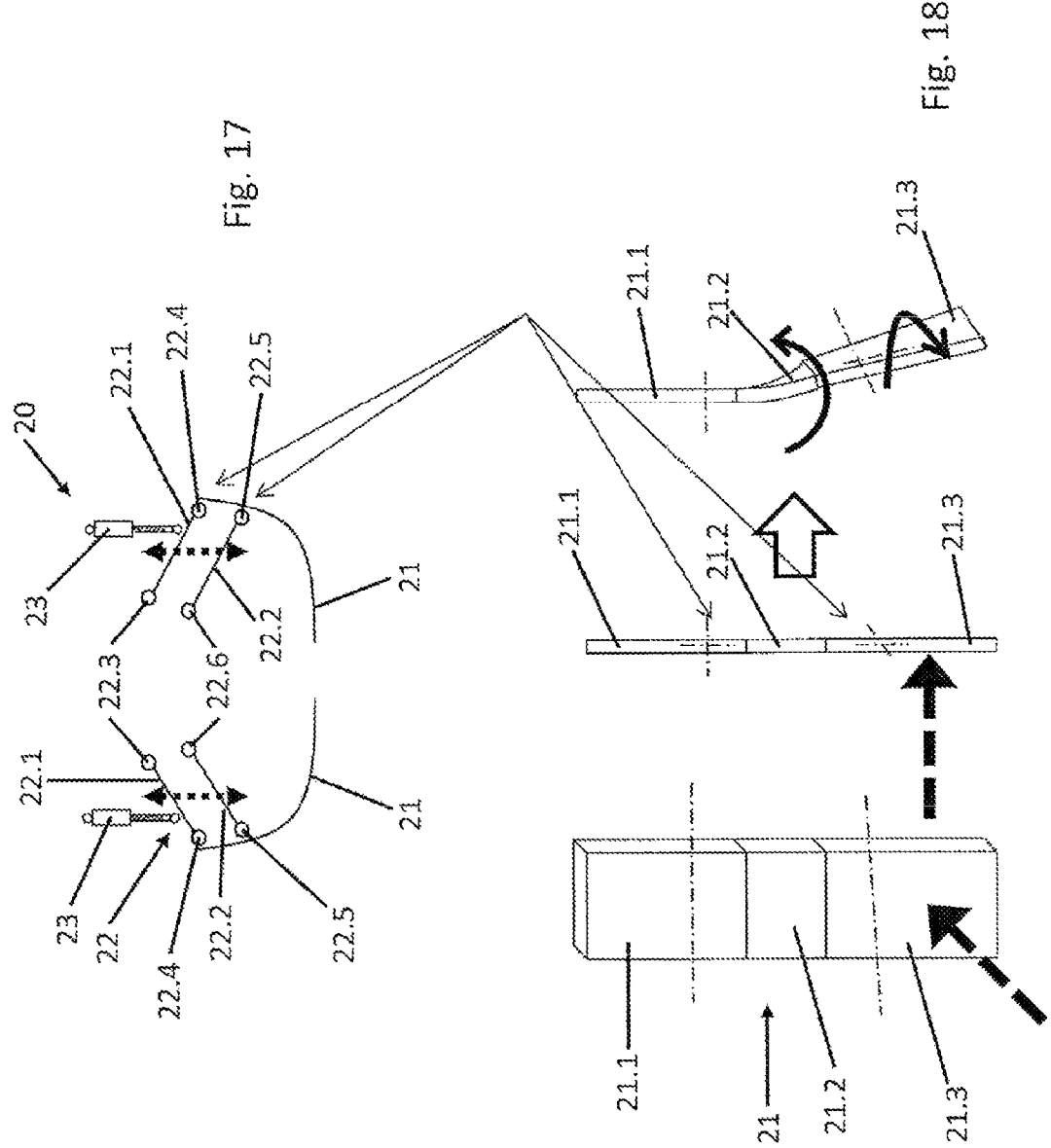

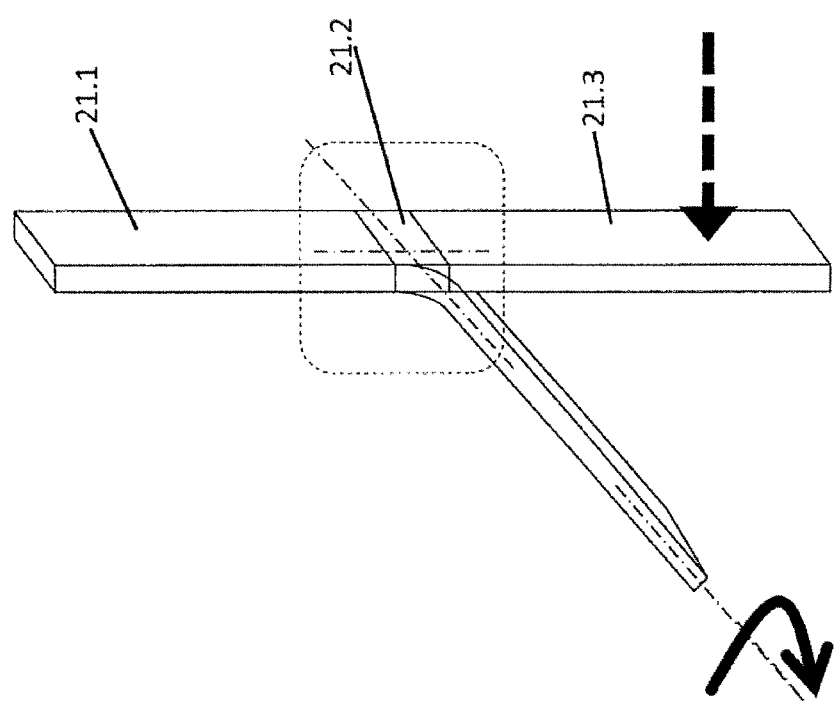

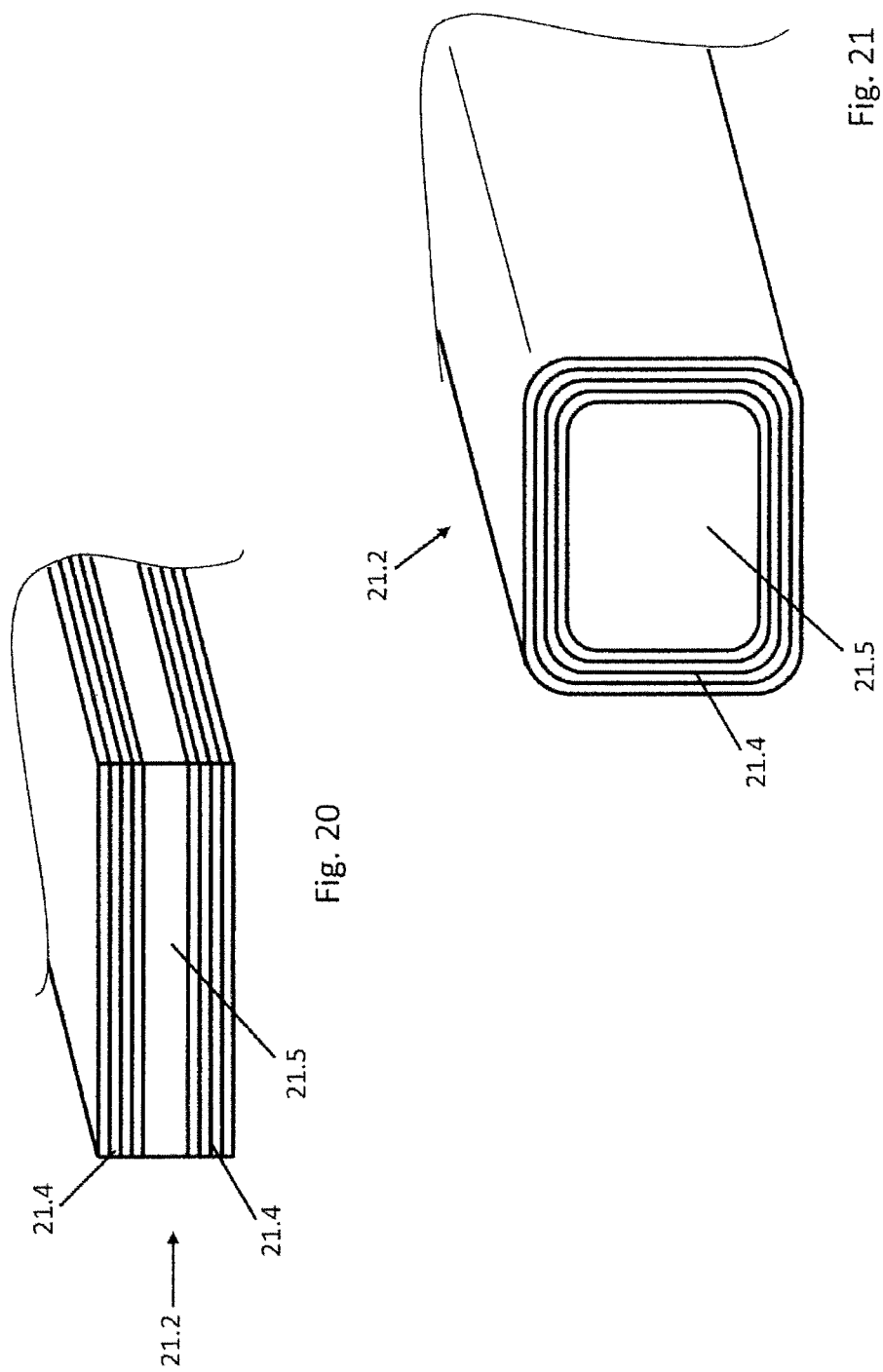

WATERCRAFT HAVING MOVEABLE HYDROFOILS

FIELD OF THE INVENTION

The invention relates to a watercraft having a hull which has each a hydrofoil assembly in the region of the stern and in the region of the bow, the hydrofoil assemblies each having hydrofoils arranged on both sides of the hull.

BACKGROUND OF THE INVENTION

Watercraft of this type are also known in the prior art as a hydrofoil boats. As driving speed increases, these watercrafts are raised by means of hydrofoils which are at least partially submerged below the surface of the water. In the water sports industry, most hydrofoils are designed as rigid, i.e. natural deformation is minimized or is limited to a small degree. In such cases, design calculations are based on a deformed geometry, which is used as the basis for optimizing the hydrofoils. The result is a hydrofoil that can be characterized as rigid or stiff.

To stabilize the position of a hydrofoil boat in water, it is expedient to provide rigid hydrofoils with movable elements. One such hydrofoil assembly is specified in WO 2011/075053 A1. Here, non-penetrating hydrofoils are connected to a hydrofoil boat via pivotable struts. When the boat experiences a disturbance in roll angle that results in transverse movement of the hydrofoil boat relative to the water surface, the struts pivot in relation to the hydrofoil boat. This causes the lifting force of the hydrofoils to be shifted transversely so as to counteract a transverse movement of the hydrofoil boat, thereby stabilizing the hydrofoil boat. For this purpose, the hydrofoils may also have adjustable elements. However, the described measures relate only to the transverse stabilization of a hydrofoil boat with non-penetrating hydrofoils.

The object of the invention is to provide a versatile watercraft of the aforementioned type, wherein a stable position in the water is achieved while maintaining good vehicle dynamics under a wide range of conditions.

SUMMARY OF THE INVENTION

This object is achieved by the features of claim 1. According to said claim, the hydrofoil assemblies are coupled to at least one adjustment unit or adjusting structure in such a way that the bow-side hydrofoil assembly and the stern-side hydrofoil assembly each are at least partially individually height adjustable.

This vertical adjustment enables a watercraft to be converted from a gliding boat, with fully retracted hydrofoil assemblies, to a hydrofoil boat with extended hydrofoil assemblies. The vertical adjustment may be made at rest or when traveling, so that the traveling height of the watercraft may be adjusted at any time, according to the circumstances, to a variety of operating and load conditions. This enables adjustment during slow or high-speed travel, for example, on calm or rough waters. The at least partially individual vertical adjustment permits the balance of momentum and force required for the given sailing conditions to be flexibly adjusted. A full retraction of the hydrofoil assembly enables space-optimized storage, e.g. on a trailer, and facilitates landing the watercraft on shallow beaches or slow crossings of shallow waters.

An advantageous variant provides for the bow-side or stern-side hydrofoils or both to each be individually vertically adjustable. It is also possible for the angle of inclination of the hydrofoils to be manipulable. For instance, the trim (longitudinal or lateral) of the watercraft may be adjusted, its cornering improved, or the properties of its driving dynamics increased or even decreased.

To ensure easy and individual manipulation, an adjustment unit or drive actuator having a drive for vertical adjustment is advantageously assigned to each hydrofoil.

For vertical adjustment that is optimized in terms of effort and adapted to the hull, the adjustment units of the bow-side or stern-side hydrofoils or of the hydrofoil assemblies are expediently attached to the hull via a lever mechanism.

Simple adjustment can be achieved by a lever mechanism embodied as a four-pivot system or a rail system.

A boat drive is advantageously assigned to the hull, wherein the boat drive has a thrust unit, in particular a marine propeller or a jet propulsion mechanism, the boat drive or at least a part of the boat drive being attached to the hull such that the engine is vertically adjustable, and an actuating unit being synchronized with the adjustment units for the hydrofoils or for the hydrofoil assembly or both. The vertical adjustability of at least part of the boat drive prevents the maximum submersion depth of the boat drive from being exceeded. It additionally enables a balance of moments and thus a stable positioning of the hull under a variety of operating and load conditions, such as start-up, acceleration, travel and deceleration. Since the balance of moments is also impacted by the hydrodynamic forces of the hydrofoil assemblies and the hydrofoils, it is expedient to synchronize an actuating unit for adjusting the boat drive with the adjustment units for the hydrofoils or at least one hydrofoil assembly. Synchronization in this context refers to a coupling of the adjustment of the boat drive with that of the hydrofoil assemblies or the hydrofoils. This may refer to heights or adjustment paths of the elements in question, with the coupling being carried out in the same or in opposite directions. For example, a vertical adjustment of the rear hydrofoil assembly by an adjustment path x can automatically trigger a vertical adjustment of the boat drive by 1x, with 1 representing a proportionality factor.

The actuating unit may also advantageously be configured such that both the height allocation of the thrust unit to the hull as well as the angular position of the thrust unit can be adjusted. A change in the angular position of the thrust unit likewise impacts the balance of moments. Thus in an advantageous variant, the angular position of the thrust unit is also at least partially coupled with an adjustment of the hydrofoil assemblies or the hydrofoils or both. Alternatively, the height allocation and the angular position of the thrust unit may likewise be coupled, or may be implemented independently of one another.

For a versatile coupling of the vertical and angular adjustment of the thrust unit, it is advantageous for the actuating unit to comprise a four-pivot system, or to form a guide having at least one non-linear guide receiving slot extending in geodetic height, or a guide having two non-parallel linear guide receiving slots, with an engine mount being adjustably guided on the guide receiving slots. Alternatively, the vertical adjustment and angular adjustment of the thrust unit may not be coupled with one another, i.e. may be carried out independently of one another.

The design of the bow-side and/or stern-side hydrofoils as part of a penetrating or non-penetrating hydrofoil assembly or the design of the bow-side or stern-side hydrofoils, or both, as coupled with one another to form a continuous hydrofoil assembly makes the watercraft highly versatile and customizable to meet individual requirements. Continuous hydrofoil assemblies that are either penetrating or non-penetrating may also be used.

The above-described adjustable components of the watercraft are adjusted in a manner optimized to various operating and load conditions in that a sensor system is assigned to the hull, wherein the sensor system detects the water level near the hull, particularly in the direction of travel in front of, below or behind the watercraft, or in that the sensor system comprises a strain gauge which indirectly or directly detects the lifting force acting on one or more hydrofoils, or in that the sensor system detects the position or acceleration and/or speed of at least a portion of the hull in space, and in that, based on the at least one measured value detected by the sensor system, a control unit controls the vertical adjustment of the hydrofoil assembly or of the hydrofoils or both. For instance, based on the at least one detected measured value, an algorithm can be defined, which then triggers a specific control action, such as an adjustment of the fore hydrofoils. Various load conditions can be induced, for example, by the movement of passengers. By their movement, and thus their changing distances from the center of gravity of the hull 10, they alter the balance of moments and can likewise be detected by the sensor system.

A simplified structure is achieved in that at least one of the hydrofoil assemblies or at least one hydrofoil has a hydrofoil region, the hydrofoil region connecting two components, in particular wing portions of the hydrofoil assembly or of the hydrofoil, to one another, or forming at least one end of the hydrofoil assembly or of the hydrofoil. In this case, the hydrofoil region is designed such that, when acted on by a load in a loading direction, it effects an adjustment of the hydrofoil assembly or of at least a part of the hydrofoil to a position of adjustment that does not coincide with to the loading direction. Of course, a position of adjustment in the loading direction or a combination of the two adjustments is also conceivable. This enables targeted deformations or responses. These may be selectively influenced by hydrodynamic forces and moments or by forces and moments that are introduced by mechanisms, for example actuators, so that the lifting surface assemblies or the lifting surfaces or both are adjusted to the desired positions and shapes. A reduction in the deformational force or the moment will result in a corresponding restoration. This can reduce the number of joints and spring mechanisms required for deformation. Additionally, the possibility of independent deformations enhances vehicle dynamics. Good stabilization, particularly under asymmetrical conditions such as cornering or diagonal wave crossing, is also achieved. This is because asymmetrical forces in particular elicit asymmetrical deformations of the flexible hydrofoil regions. These can advantageously cause the lifting forces of the hydrofoils to likewise be asymmetrically distributed, thereby stabilizing the watercraft. In a watercraft with penetrating hydrofoils, during cornering, for example, centripetal forces can cause the position of the hydrofoils in the water to be such that the effective lifting surface of the hydrofoil with respect to the side of the boat facing the curve is increased, while that of the side facing away from the curve is decreased. This results in a lifting force which counteracts the rolling movement of the watercraft, thereby stabilizing it. The change in the effective lifting surface may be caused by the deformation of the hydrofoils, but also by their submerged portion and angle of submersion, but in most cases is caused by a combination of these factors.

A design in which the hydrofoil region is embodied as a layered element, the layers of which are made of fiber materials, and in which the main fiber directions of the fiber materials of at least two adjoining layers are different from one another makes it possible to provide specific deformation properties while at the same time providing high stability.

The same is achieved by the design variant in which the hydrofoil regions have a discontinuous cross-sectional profile.

BRIEF DESCRIPTION OF THE DRAWINGS

In the following, the invention will be specified in greater detail in the context of embodiment examples, with reference to the set of drawings. Shown are.

DETAILED DESCRIPTION OF THE ILLUSTRATIVE EMBODIMENT

Figure 1:
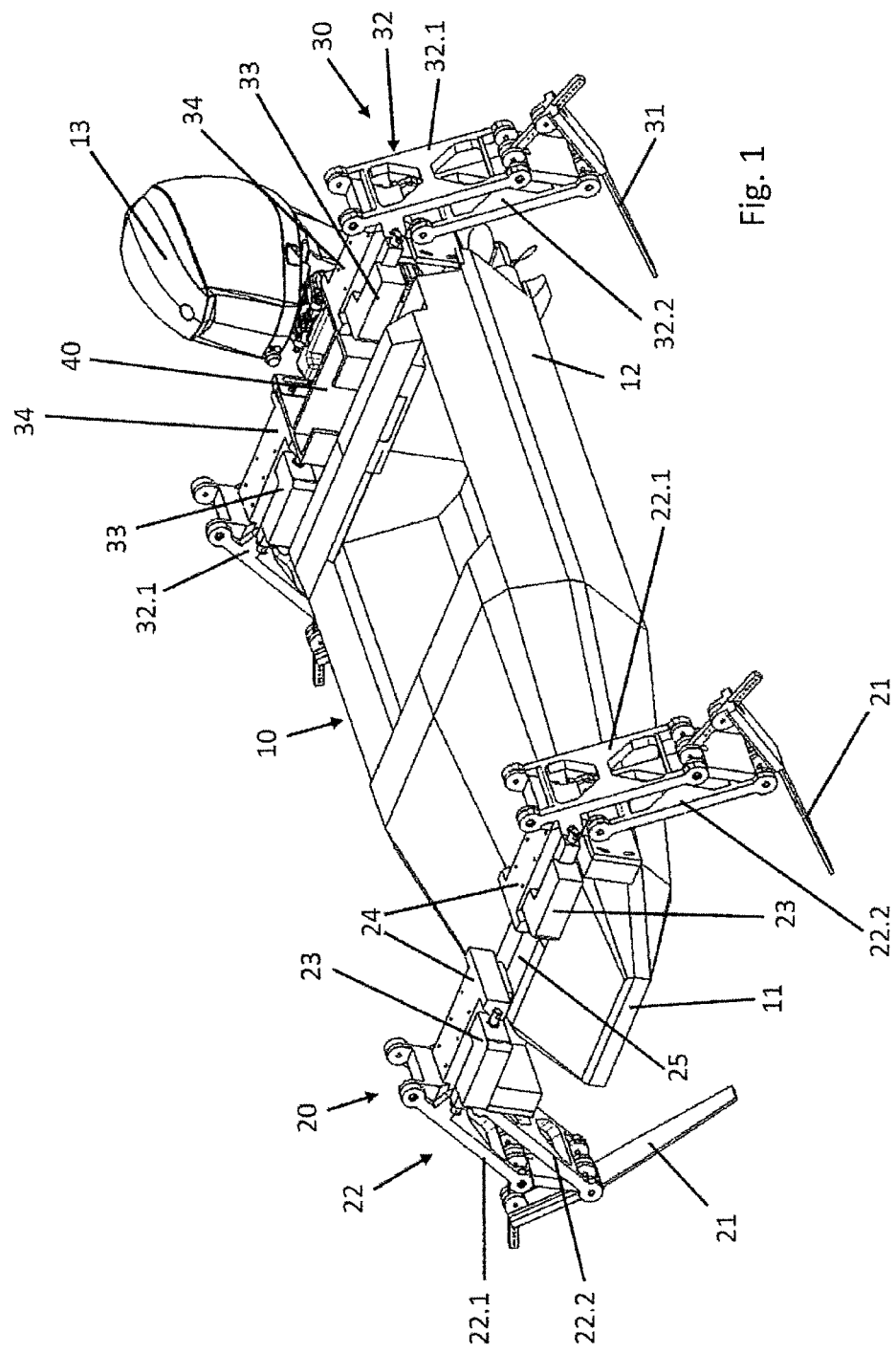
FIG. 1 a perspective view of a watercraft.

FIG. 1 shows a watercraft with a hull 10 which has a bow 11 and a stern 12. In the bow region a hydrofoil assembly 20, and in the stern region a hydrofoil assembly 30 is connected to hull 10 so as to enable a transfer of force from hydrofoil assembly 20, 30 to hull 10. The connection may be made directly or indirectly, for example via a mount 40 for a boat drive 13. At the ends of the hydrofoil assemblies 20, 30 that are designed to be submerged below the surface of the water, hydrofoils 21, 31 are disposed, one on each side of hull 10. The hydrofoils are C-wings that are not connected to one another. Other forms are also possible. Hydrofoils 21, 31 are movably coupled to hull 10 via adjustment units 22, 32, for example.

At the stern end of hull 10, a boat drive 13 is disposed by means of a mount 40. In the present embodiment, this is an outboard motor, however another engine configurations, such as an inboard motor, are also conceivable. Also attached to mount 40 is the stern-side hydrofoil assembly 30.

Figure 2:
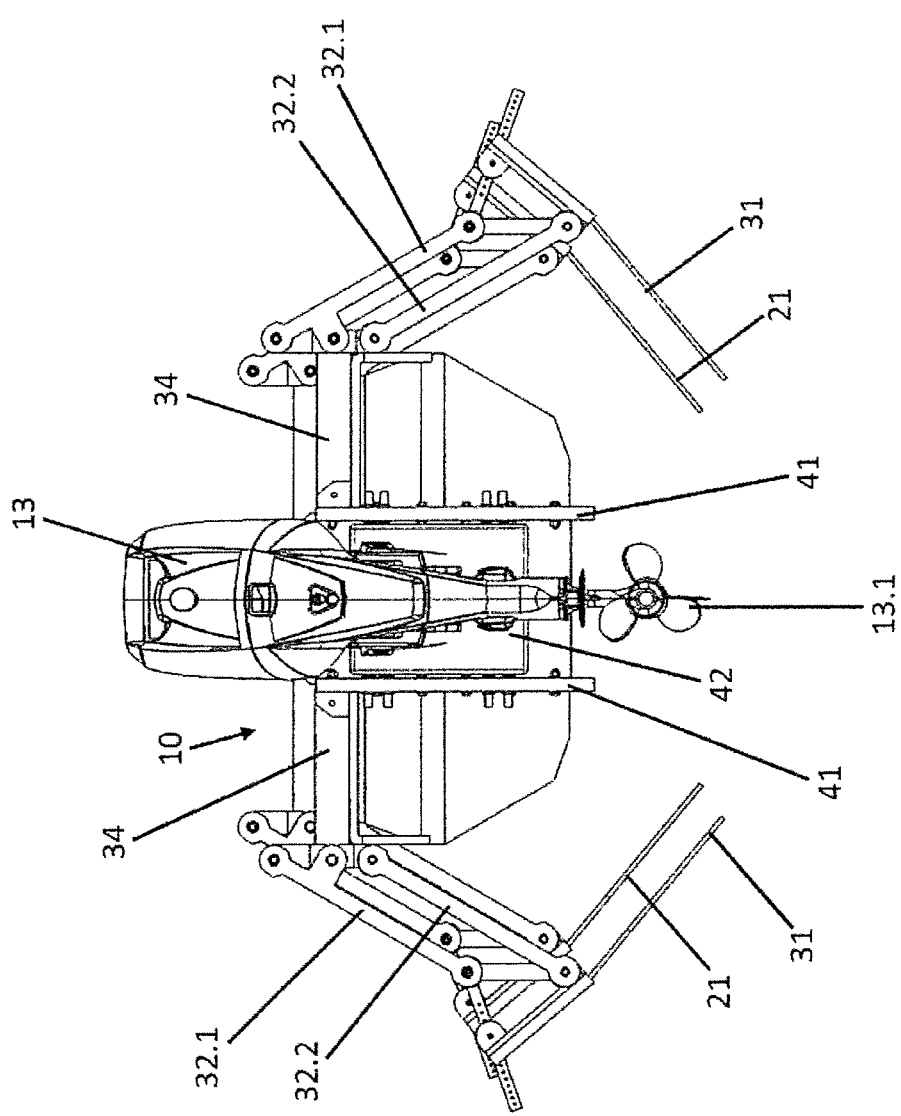
FIG. 2 the watercraft of FIG. 1 in a view from the rear.

As is clear from FIG. 2, mount 40 has an actuating unit 41 and an engine bracket 42, to which boat drive 13 is securely but detachably connected, for example by means of screws. A marine propeller 13.1 serves as the thrust unit on boat drive 13. However, other thrust units, such as a jet propulsion mechanism, are also conceivable.

Figure 3:
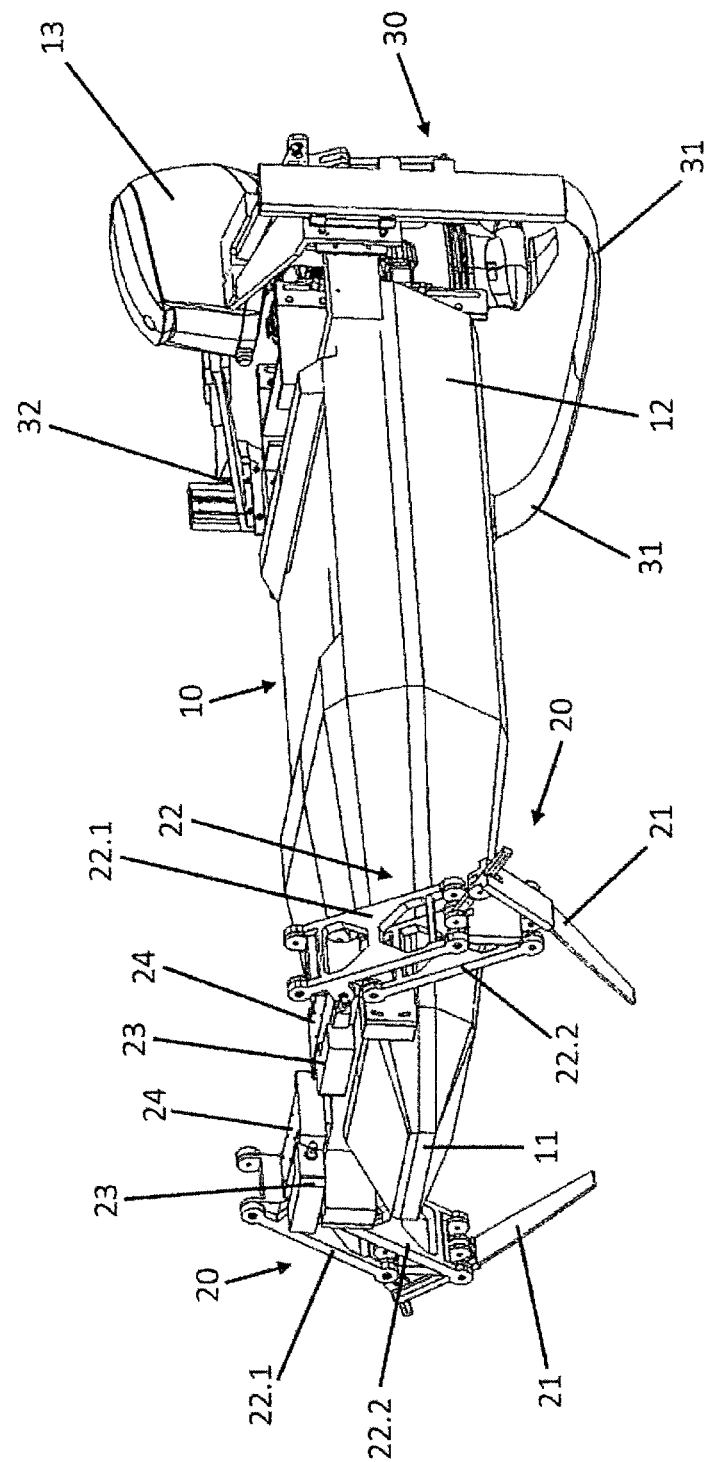
FIG. 3 a perspective view of a watercraft with a continuous hydrofoil assembly positioned at the stern, FIG. 4 the watercraft of FIG. 3 from a side view, FIG. 4a a schematic partial view of the stern of a watercraft with a parallel swinging element, swinging clockwise, FIG. 4b a schematic partial view of a stern of a watercraft with a parallel swinging element, swinging counter-clockwise, FIG. 5 the watercraft of FIG. 3 in a view from the rear, FIG. 6 a perspective view of a bow-side hydrofoil assembly, FIG. 7 a perspective view of a stern-side hydrofoil assembly and a boat drive, FIG. 8 a schematic side view of moments acting on a watercraft through horizontal forces, FIG. 9 a schematic side view of moments acting on the watercraft of FIG. 8 through vertical forces, FIG. 10 a schematic view of a watercraft with fully extended hydrofoil assemblies, FIG. 11 a schematic side view of the watercraft of FIG. 10 with partially extended hydrofoil assemblies, FIG. 12 a schematic side view of the watercraft of FIG. 10 with retracted hydrofoil assemblies, FIG. 13 a schematic partial view of the stern of a watercraft with boat drive, FIG. 14 a schematic illustration of an actuating unit, from a side view, FIG. 15 an actuating unit from a perspective view, FIG. 16 an actuating unit from a side view, FIG. 17 a schematic illustration of hydrofoils, FIG. 18 a hydrofoil from a perspective view and a side view, FIG. 19 a perspective view of a deformation of a hydrofoil, FIG. 20 a perspective partial view of a hydrofoil region, FIG. 21 a perspective partial view of a hydrofoil region, FIG. 22 a perspective view of a hydrofoil region with a tapered cross-section, FIG. 23 the hydrofoil region of FIG. 22 under torsion, FIG. 24 the hydrofoil region of FIG. 22 under deflection, FIG. 25 a perspective view of a hydrofoil region with a flat cross-section, FIG. 26 the hydrofoil region of FIG. 25 under deflection, and FIG. 27 the hydrofoil region of FIG. 26 under torsion.

FIG. 3 shows a watercraft with a hull 10, on which the stern-side hydrofoil assembly 30 is formed as continuous. This is achieved by coupling hydrofoils 31 to one another directly on the side that is submerged below the surface of the water.

A side view of the watercraft shown in FIG. 3 is shown in FIG. 4. FIG. 5 shows a view from the rear. As is clear from FIG. 5, hydrofoils 21 of the bow-side hydrofoil assembly 20 are aligned obliquely with respect to a longitudinal center plane (xz-plane, x-axial profile, see FIG. 4) of hull 10. In contrast, hydrofoils 31, which are coupled to one another, extend nearly perpendicular to the longitudinal center plane of hull 10. They are connected to adjustment unit 32 via hydrofoil components 35, which extend nearly in the z-direction.

Details of a bow-side hydrofoil assembly 20 are shown in FIG. 6, and details of a stern-side hydrofoil assembly are shown in FIG. 7. FIG. 6 shows a bow-side hydrofoil assembly 20 with hydrofoils 21 and adjustment units 22. On the side facing away from the water, each of the lifting wings 20, arranged one on each side, is equipped with a drive 23, each drive being attached to a respective bracket 24. The brackets 24 are in turn mounted on a bridge 25 which extends in the y-direction, so that it connects the elements arranged on both sides. Adjustment units 22 are movably affixed to the brackets 24. The adjustment units are equipped with parallel levers 22.1 and 22.2, which are pivotably connected to one another via joints and transition pieces. This enables the hydrofoils 21 disposed on adjustment units 22 to be height adjustable. The inclination of hydrofoils 21 is also variable.

The stern-side hydrofoil assembly 30 shown in FIG. 7 with hydrofoils 31 and adjustment units 32 has a drive 33 for each hydrofoil, each drive being attached to a bracket 34. Brackets 34 are mounted on the two sides of mount 40 for boat drive 13. Adjustment units 32 are movably affixed to the brackets 34. The adjustment units are equipped with parallel levers 32.1 and 32.2, which are pivotably connected to one another via joints and transition pieces. This enables the hydrofoils 31 disposed on adjustment units 32 to be adjusted.

In FIGS. 4-7, levers 22.1 and 22.2 and levers 32.1 and 32.2 are pivotable around the x-axis. It is also conceivable, however, for levers 22.1 and 22.2 and levers 32.1 and 32.2 to be pivotable around the y-axis, as is illustrated as a design variant in FIGS. 4a and 4b. Lever mechanisms of this type are particularly low-maintenance and require low structural complexity.

The embodiments shown in FIGS. 1-7 allow the individual hydrofoils 21, 31 and/or the individual hydrofoil assemblies 20, 30 or both to be adjusted individually by means of the respective drives 23, 33 provided for each of the hydrofoils 21, 31. The drives 23, 33 can electric, mechanical or hydraulic in design, or may also be operated manually. In addition, boat drive 13 can be height adjustable or its angular position changed by means of actuating unit 40. Adjusting these components alters the balance of forces and moments, thereby enabling adaptation to different operating and load conditions. For example, the trim (longitudinal and lateral) of the watercraft may be adjusted, and cornering and travel over waves may be improved. The adjustment of hydrofoil assemblies 20, 30 or of hydrofoils 21, 31 may be carried out in a coupled manner. For a balance of moments, it is particularly useful to couple the position of boat drive 13 with the adjustment of stern-side hydrofoil assembly 30, with the coupling being carried out in the same or in opposite directions.

Figure 8:
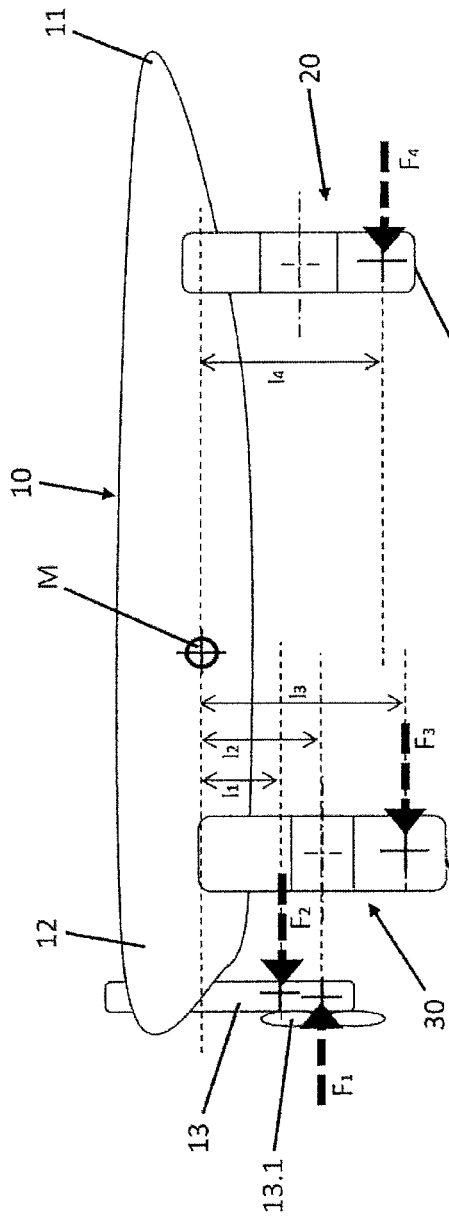
Figure 9:
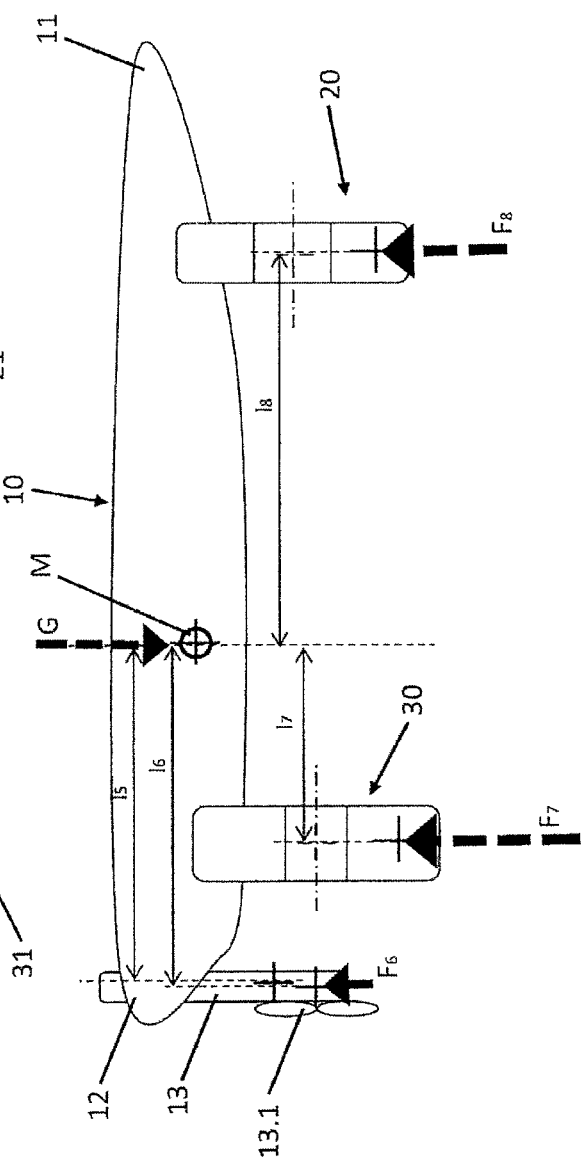

FIG. 8 and FIG. 9 visualize the moments predominating in the water with respect to the center of gravity M of the watercraft with hydrofoils 21, 31 in the fully extended state. The moments arise from the forces F1-F8 resulting from active hydrofoils 21, 31 and the boat drive, and the lever arms 11-18 thereof. FIG. 8 illustrates the impact of the resulting horizontal forces, i.e. forces acting orthogonally with respect to gravity. FIG. 9 depicts the vertical forces acting in the direction of gravity. It should be noted that the length of the force arrows is not proportional to their value. F1 represents the driving force of boat drive 13, F2 to F4 represent the drag forces of boat drive 13 and of hydrofoils 21, 31, G represents the gravitational force and F6 to F8 represent the lifting forces of boat drive 13 and of hydrofoils 21, 31 that counteract the force of gravity. By means of vertical and angular adjustments, the active lever arms 11-18 can then be at least partially adjusted, and the direction and amount of active forces F1 to F8 can be at least partially modified. This results in a wide range of options for influencing the balance of moments and thereby the position of the boat in the water. Driving force F1 and the resulting lifting force F7 of stern-side hydrofoil assembly 30, the moments of which counteract one another, make up a large proportion of the overall balance. The rear hydrofoil assembly advantageously makes up more than 65% of the total lifting force. Thus the coupling of the adjustment of these moments so as to produce a desired ratio enables the balance of moments and the shift in the center of gravity, along with the position of the hull, to be controlled with an optimum amount of effort.

Figure 10:
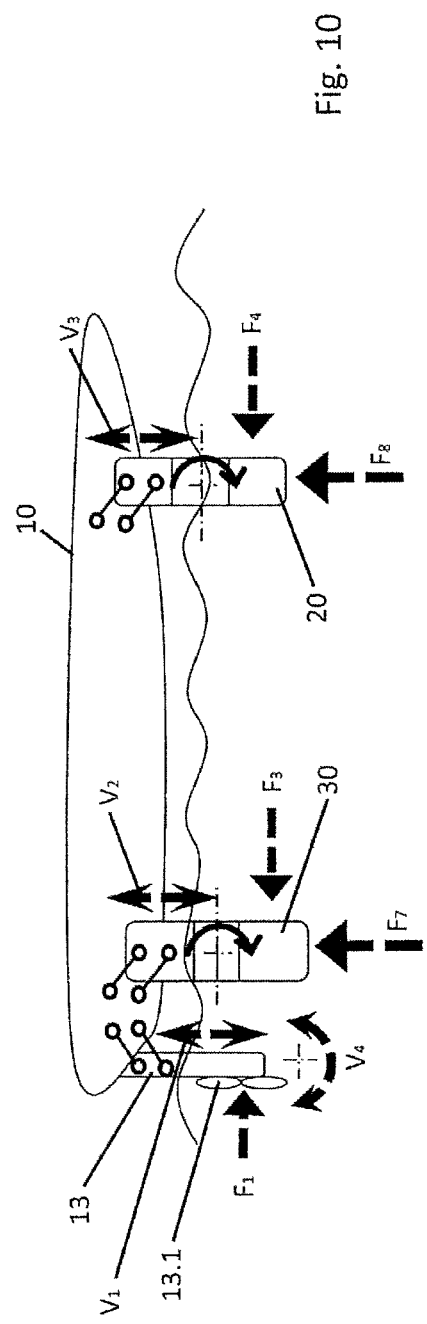
Figure 11:
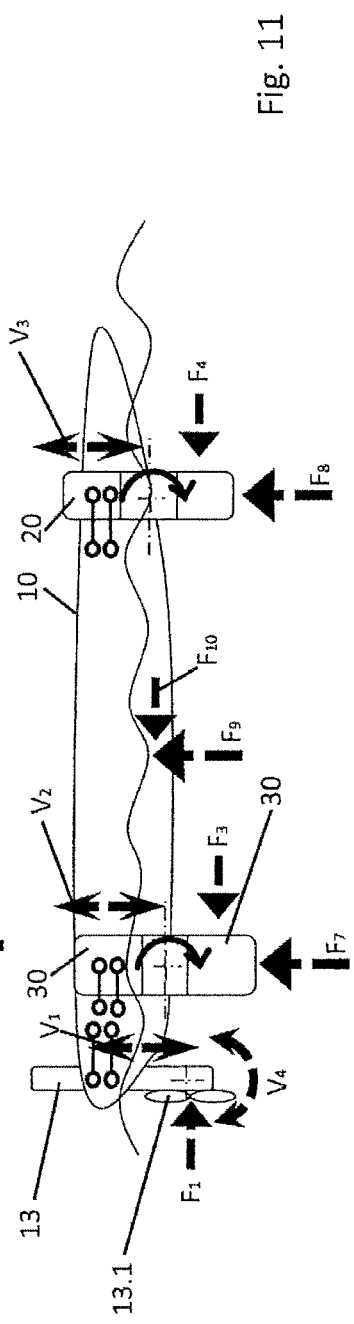
Figure 12:
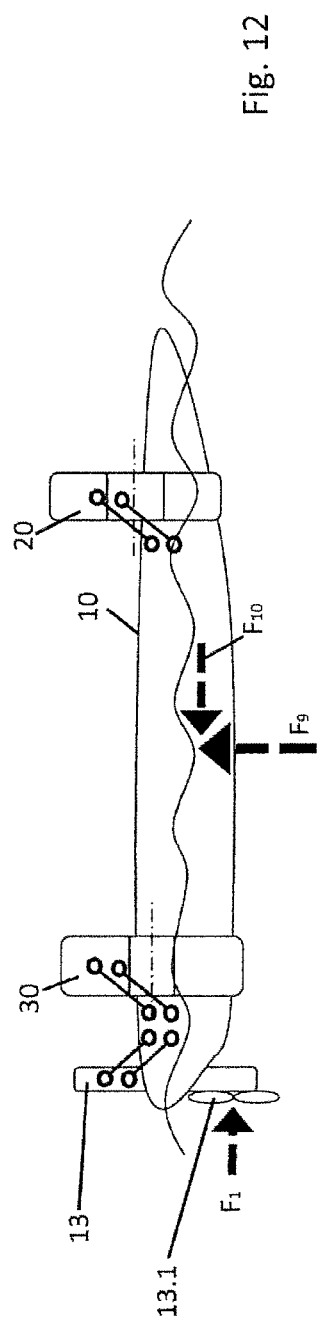

FIGS. 10 to 12 show various extension states of the adjustable components, i.e., of hydrofoil assemblies 20, 30 and of boat drive 13.1, and the associated positions of hull 10 in the water. This sequence of extension states is typical of the transition from high-speed travel, in which the components are fully extended (FIG. 10), through a deceleration phase in which the components are partially retracted (FIG. 11), to stopping, with the components fully retracted (FIG. 12). The various positions of hull 10 result from forces and moments adjusted in accordance with the driving status. In the relevant figures, a vertical adjustment is provided by pivoting around the y-axis. V1 to V3 indicate the options for adjusting hydrofoil assemblies 20, 30 or boat drive 13.1 vertically, and V4 indicates the option for angular adjustment of boat drive 13.1.

In FIG. 10, hull 10 is not in contact with the surface of the water due to the fully extended components, and the watercraft is acting as a hydrofoil boat. Forces F1 to F8 described in FIGS. 8 and 9 are then acting accordingly. When the components are in the partially retracted condition (FIG. 11), hull 10 is in contact with the water surface or is penetrating partly through the surface of the water, therefore additional lifting (F9) and drag forces (F10) are exerted via the part of the hull 10 that is in the water. When the components are fully retracted (FIG. 12), no additional forces F3 to F8 are introduced via hydrofoils 21, 31 and the watercraft acts as a planing hull.

Figure 13:
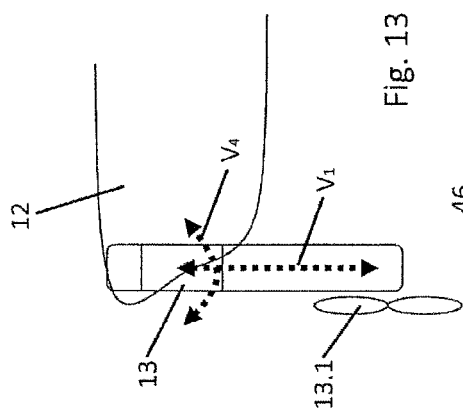
Figure 14:
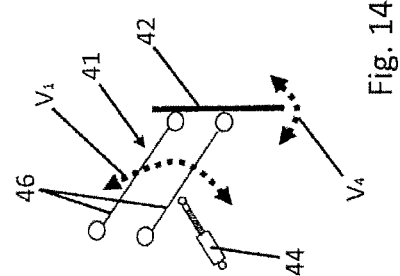

FIGS. 13 to 16 detail possible design variants for adjusting boat drive 13, so that the adjustment options shown in FIG. 13 can be implemented in terms of height (V1) and angle (V4). In a simple variant (FIG. 14), actuating unit 41 has two parallel lever arms 46, via which engine mount 42 is arranged on hull 10 such that it can be adjusted, for example via joints. Adjustment is carried out via an actuator 44, which may be operated hydraulically, for example. However, mechanical, electrical or manual operation is also possible. It is conceivable to design the lever arms as telescoping, so that height and angle adjustments may be carried out simultaneously.

Figure 16:
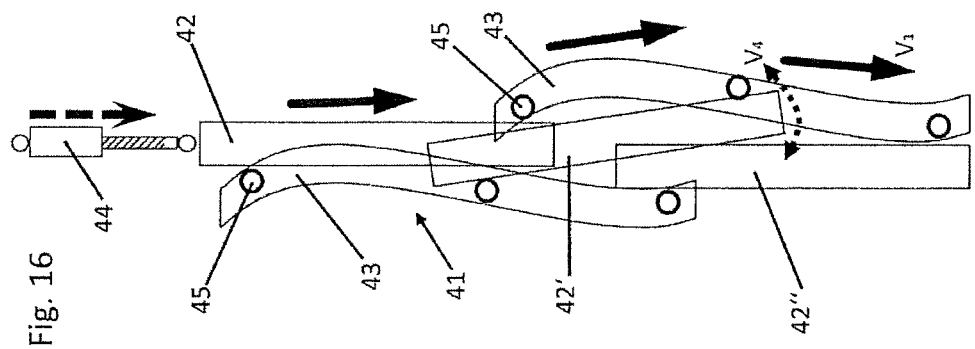
Figure 15:
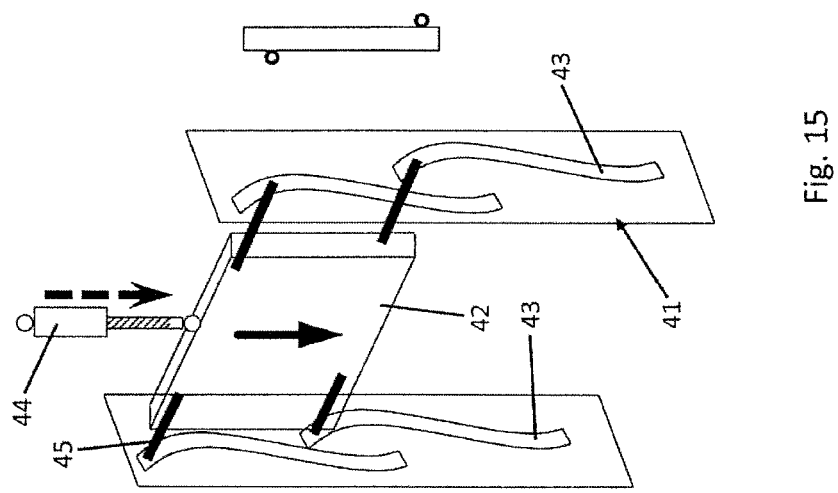

FIGS. 15 and 16 show a variant of actuating unit 41 in which engine mount 42 is guided via guide receiving slots 43. For this purpose, engine mount 42 is coupled via guide elements 45 with guide receiving slot 43. Actuator 44 is provided for vertical adjustment. The action of guide receiving slot 43 is illustrated in FIG. 16, which shows engine mount 42 in different positions (42, 42', 42"). Clearly depicted is the coupling of the vertical and angular adjustment, which is accomplished via the specific shape of guide receiving slots 43. Different forms of guide receiving slots 43 allow different couplings of vertical and angular adjustments to be achieved.

FIG. 17 shows hydrofoil assembly 20 with flexible hydrofoils 21, the flexible hydrofoil regions 21.2 of which will be described in greater detail in subsequent FIGS. 18 to 27. In FIG. 17, hydrofoils 21 can be movably connected to hull 10 via adjustment units 22. Adjustment units 22 have levers 22.1 and 22.2 extending in parallel, which can be pivoted via joints 22.3-22.6. Adjustment units 22, and thus the hydrofoils 21 disposed thereon, can be height adjustable via actuators 23. When force conditions change as a result of the adjustment, the hydrofoils are selectively deformed by virtue of their flexibility. The flexible hydrofoils 21 may be designed such that the load results in an adjustment position that does not correspond to the loading direction. In addition to the passive deformation caused by external forces acting on the watercraft, the flexible hydrofoil regions 21.1 may be deformed by means of actuators.

FIG. 18 shows an exemplary variant of a hydrofoil 21 designed as flexible. The figure shows a perspective view from the front of the hydrofoil, a side view of the hydrofoil in a non-adjusted position, and a side view of hydrofoil 21 in a position to which it has been adjusted by force. Hydrofoil 21 has two hydrofoil sections 21.1 and 21.3, which are connected to one another by a hydrofoil region 21.2. A force is acting on the longitudinal center axis of hydrofoil 21 (see perspective view), specifically on hydrofoil section 21.3, from the left (with respect to the side view). The flexible hydrofoil region 21.2 then not only permits a deflection toward the right, but also undergoes torsional movement that does not coincide with the loading direction. This enables a lifting force to effect both a change in the angle of the one hydrofoil section 21.3 with respect to a longitudinal center axis and a change in the angle of inclination, and thus in the effective lifting surface area. As is clear from FIG. 19, however, flexible hydrofoil region 21.2 may also be designed simply for bending deformation. When the deformational force is reduced or eliminated, the deformation is reversed accordingly. Flexible hydrofoil region 21.2 could also extend over the entire hydrofoil 21, making it a single flexible element. In that case, it may have areas with different degrees of flexibility.

FIGS. 20 and 21 show typical configurations of flexible hydrofoil regions 21.2. The regions comprise a flexible core component 21.5, which is at least partially covered on its planar surfaces (FIG. 20) or around its entire periphery (FIG. 21) by layers 21.5. The individual layers may be produced by different manufacturing methods such as tufting, sewing, etc. Suitable materials include, for example, carbon fiber, fiberglass, aramid fiber, basalt, natural fiber types, etc. Since each of these materials offers different advantages, combinations are also possible. For example, carbon fiber offers high stability, but is costly. Fiberglass is lightweight, aramid is non-splintering, and basalt is chemically stable in salt water, i.e. it does not require specific treatment. The layer material and the thickness, style, and/or orientation of the layers determine the response of the flexible hydrofoil region 21.2 under loads. In the simplest case, the entire flexible hydrofoil region 21.2 may be made of a solid, isotopic material.

Figure 24:
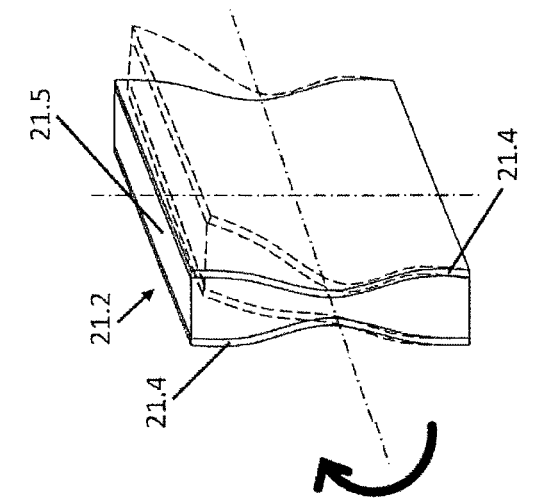
Figure 23:
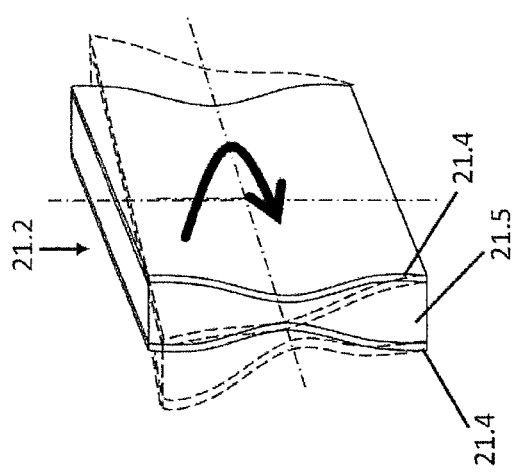
Figure 22:
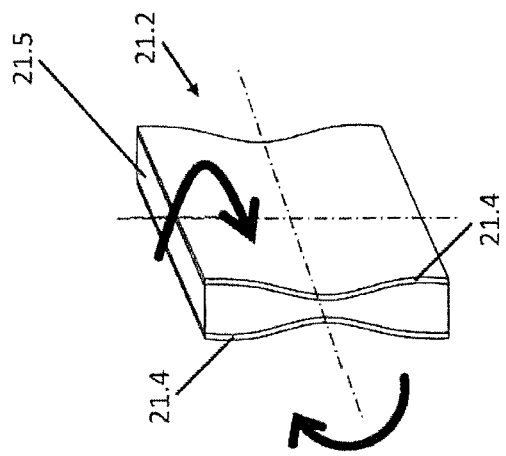
Figure 27:
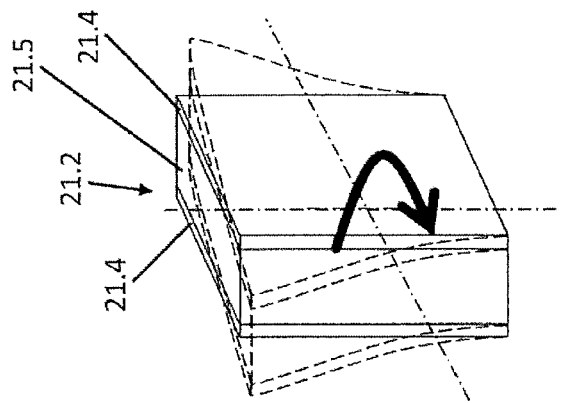
Figure 26:
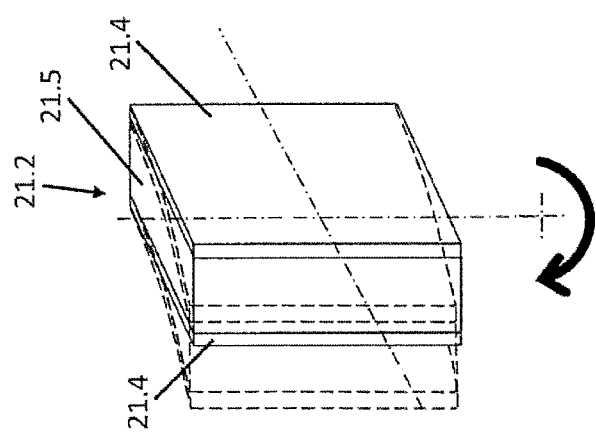
Figure 25:
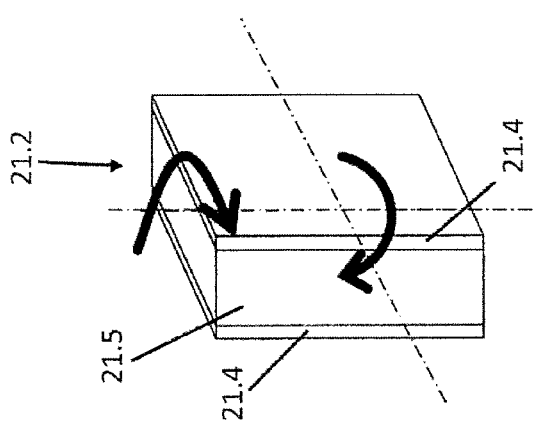

Depending on the desired degree of deflection, flexible core element 21.5 may be tapered, as shown in FIGS. 22 to 24. These figures show the responses of a tapered flexible hydrofoil region 21.2 under different loads. Alternatively, a planar core component 21.5 may be used. Responses of a planar flexible hydrofoil region 21.2 under different load conditions are shown in FIGS. 25 through 27.

Flexible hydrofoil regions 21.2 allow the number of joints and springs that are used to be decreased, which can simplify construction of the watercraft and make it less prone to malfunction. In addition, the flexible hydrofoil regions 21.2 can provide a certain degree of damping of shocks and vibrations.

The above embodiments of the watercraft according to the invention demonstrate its versatility resulting from its wide variability. For example, the various different adjustment options allow a stable position in the water to be maintained while at the same time ensuring good driving dynamics under a wide range of conditions.

What is claimed is:

1. A watercraft having a hull (10) with a stern (12) and a bow (11), a first hydrofoil arrangement (30) at the stern (12) and a second hydrofoil arrangement (20) at the bow (11), the first hydrofoil arrangement (30) including a plurality of first hydrofoils (31) and the second hydrofoil arrangement (20) including a plurality of second hydrofoils (21), the plurality of second hydrofoils includes a first hydrofoil (21) positioned on a first side of hull (10) and a second hydrofoil (21) positioned on a second side of the hull (10) opposite the first side, wherein the plurality of first hydrofoils includes a third hydrofoil (31) positioned on the first side of the hull (10) and a fourth hydrofoil (31) positioned on the second side of the hull (10), wherein the first hydrofoil arrangement (30) is coupled to a first adjustment unit (32), wherein the first adjustment unit is associated with each of the plurality of first hydrofoils, the first adjustment unit having a first actuator for vertical adjustment of each first hydrofoil such that the first hydrofoil arrangement (30) is at least partially individually height-adjustable, and the second hydrofoil arrangement (20) is coupled to a second adjustment unit (22), wherein the second adjustment unit is associated with each of the plurality of second hydrofoils, the second adjustment unit having a second actuator for vertical adjustment of each second hydrofoil such that the second hydrofoil arrangement (20) is at least partially individually height-adjustable, wherein the first adjustment unit and the second adjustment unit are connected to the hull (10) via a lever mechanism, and wherein at least one of (a) each of the first hydrofoil and the second hydrofoil is individually and independently height-adjustable or (b) each of the third hydrofoil and the fourth hydrofoil is individually and independently height-adjustable;

the watercraft further comprising a boat drive (13) positioned on the hull (10) and an actuating unit (41), wherein the boat drive (13) includes a marine propeller (13.1) or a jet propulsion mechanism, and at least a part of the boat drive (13) is vertically adjustably connected to the hull (10), wherein the actuating unit (41) is moved in a synchronized manner with at least one of the first adjustment unit or the second adjustment unit, in order to achieve stable positioning of the hull (10) under a variety of operating and load conditions; and an engine mount (42), wherein the engine mount (42) includes the actuating unit (41) which comprises a four-pivot system or at least one guide receiving slot (43), and the engine mount (42) is adjustable guided on the at least one guide receiving slot (43).

2. A watercraft having a hull (10) with a stern (12) and a bow (11), a first hydrofoil arrangement (30) at the stern (12) and a second hydrofoil arrangement (20) at the bow (11), the first hydrofoil arrangement (30) including a plurality of first hydrofoils (31) and the second hydrofoil arrangement (20) including a plurality of second hydrofoils (21), wherein the plurality of second hydrofoils includes a first hydrofoil (21) positioned on a first side of hull (10) and a second hydrofoil (21) positioned on a second side of the hull (10) opposite the first side, wherein the plurality of first hydrofoils includes a third hydrofoil (31) positioned on the first side of the hull (10) and a fourth hydrofoil (31) positioned on the second side of the hull (10), wherein the first hydrofoil arrangement (30) is coupled to a first adjustment unit (32), wherein the first adjustment unit is associated with each of the plurality of first hydrofoils, the first adjustment unit having a first actuator for vertical adjustment of each first hydrofoil such that the first hydrofoil arrangement (30) is at least partially individually height-adjustable, and the second hydrofoil arrangement (20) is coupled to a second adjustment unit (22), wherein the second adjustment unit is associated with each of the plurality of second hydrofoils, the second adjustment unit having a second actuator for vertical adjustment of each second hydrofoil such that the second hydrofoil arrangement (20) is at least partially individually height-adjustable, wherein the first adjustment unit and the second adjustment unit are connected to the hull (10) via a lever mechanism including at least one of a four-pivot system or a rail system, and wherein at least one of (a) each of the first hydrofoil and the second hydrofoil is individually and independently height-adjustable or (b) each of the third hydrofoil and the fourth hydrofoil is individually and independently height-adjustable.

3. The watercraft according to claim 1, further comprising a boat drive (13) positioned on the hull (10) and an actuating unit (41), wherein the boat drive (13) includes a marine propeller (13.1) or a jet propulsion mechanism, and at least a part of the boat drive (13) is vertically adjustably connected to the hull (10), and wherein the actuating unit (41) is moved in a synchronized manner with at least one of the first adjustment unit or the second adjustment unit, in order to achieve stable positioning of the hull (10) under a variety of operating and load conditions.

4. The watercraft according to claim 3, wherein the actuating unit (41) provides for at least one of an allocation of a height (V1) of a thrust unit of the boat drive (13) with respect to the hull (10) or for an adjustment of an angular position (V4) of the thrust unit.

5. The watercraft according to claim 2, wherein at least one of the plurality of first hydrofoils or the plurality of second hydrofoils are part of a penetrating or non-penetrating hydrofoil arrangement (20, 30), or at least one of the plurality of first hydrofoils or the plurality of second hydrofoils are coupled to one another to form a continuous hydrofoil arrangement.

6. The watercraft according to claim 2, further comprising a sensor system which at least one of determines a water level near the hull or which comprises a strain gauge which indirectly or directly detects a lifting force acting on one or more of the plurality of first hydrofoils or the plurality of second hydrofoils, wherein the sensor system detects at least one of a position, an acceleration, or a speed of at least a portion of the hull (10) in space; and wherein, based on at least one measured value detected by the sensor system, the vertical adjustment of at least one of the first hydrofoil arrangement or the second hydrofoil arrangement is controlled.

7. The watercraft according to claim 6, wherein the hydrofoil region (21.2) is formed as a layered element, the layered element being formed from fiber materials, and wherein a main fiber direction of the fiber materials of at least two adjoining layers (21.4) of the layered element are different from one another.

8. The watercraft according to claim 2, wherein at least one first hydrofoil of the plurality of first hydrofoils has a hydrofoil region (21.2), the hydrofoil region (21.2) connecting two components, in the form of swing parts (21.1, 21.3) of the at least one first hydrofoil, to one another or forming at least one end of the at least one first hydrofoil, and wherein the hydrofoil region (21.2) effects an adjustment of at least a part of the at least one first hydrofoil to a position of adjustment, when a load acts on the hydrofoil region (21.2) in a loading direction, wherein a direction of adjustment does not coincide with the loading direction.

9. The watercraft according to claim 8, wherein the water level near the hull is determined in at least one of a direction of travel in front of, below or behind the watercraft.

10. The watercraft according to claim 8, wherein the hydrofoil region has a discontinuous cross-sectional profile.

11. The watercraft according to claim 8, wherein the hydrofoil region (21.2) includes at least one layer of material applied to a core component (21.5) having two sides, a modulus of elasticity of the core component being different than a modulus of elasticity of the at least one layer of material.

12. The watercraft according to claim 2, wherein each of the first actuator and the second actuator (23, 33) imposes a load in the loading direction during adjustment.

13. A watercraft having a hull (10) including a stern (12) and a bow (11), a boat drive (13) and an actuating unit (41) for adjusting the boat drive (13), the watercraft comprising a first hydrofoil arrangement (30) at the stern (12) and a second hydrofoil arrangement (20) at the bow (11), the first hydrofoil arrangement (30) including a plurality of first hydrofoils (31) and the second hydrofoil arrangement (20) including a plurality of second hydrofoils (21),
  wherein the plurality of second hydrofoils includes a first hydrofoil (21) positioned on a first side of hull (10) and a second hydrofoil (21) positioned on a second side of the hull (10) opposite the first side,
  wherein the plurality of first hydrofoils includes a third hydrofoil (31) positioned on the first side of the hull (10) and a fourth hydrofoil (31) positioned on the second side of the hull (10),
  wherein the first hydrofoil arrangement (30) is coupled to a first adjustment unit (32) such that the first hydrofoil arrangement (30) is at least partially individually height-adjustable and the second hydrofoil arrangement (20) is coupled to a second adjustment unit (22) such that the second hydrofoil arrangement (20) is at least partially individually height-adjustable, and
  wherein at least one of (a) each of the first hydrofoil and the second hydrofoil is individually and independently height-adjustable or (b) each of the third hydrofoil and the fourth hydrofoil is individually and independently height-adjustable,
  wherein the boat drive (13) is positioned on the hull and includes a thrust unit, and at least a part of the boat drive (13) is vertically adjustably connected to the hull (10) such that the boat drive is vertically adjustable independently from each of the first hydrofoil arrangement (30) and the second hydrofoil arrangement (20), and
  wherein the actuating unit (41) is synchronized with at least one of the first adjustment unit or the second adjustment unit.

14. The watercraft according to claim 13, wherein each of the first adjustment unit and the second adjustment unit (22, 32) is connected to the hull (10) via a lever.

15. The watercraft according to claim 14, wherein the lever includes a four-pivot system and/or a rail system.

16. The watercraft according to claim 13, further comprising a sensor system for at least one of (a) determining a water level near the hull (10), in at least one of a direction of travel in front of, below or behind the watercraft, or
  (b) the sensor system further comprises a strain gauge, which indirectly or directly detects a lifting force acting on one or more of the plurality of first hydrofoils or the plurality of second hydrofoils, wherein the sensor system detects at least one of a position, an acceleration, or a speed of at least a portion of the hull (10) in space, and
  wherein based on at least one measured value detected by the sensor system, the vertical adjustment of at least one of the first hydrofoil arrangement or the second hydrofoil arrangement is controlled.

17. The watercraft according to claim 13, wherein at least one first hydrofoil of the plurality of first hydrofoils has a hydrofoil region (21.2), the hydrofoil region (21.2) connecting two components, in the form of swing parts (21.1, 21.3) of the at least one first hydrofoil, to one another or forming at least one end of the at least one first hydrofoil, and wherein the hydrofoil region (21.2) effects an adjustment of at least a part of the at least one first hydrofoil to a position of adjustment, when a load acts on the hydrofoil region (21.2) in a loading direction, wherein a direction of adjustment does not coincide with the loading direction.

18. The watercraft according to claim 17, wherein the hydrofoil region (21.2) is formed as a layered element, the layered element being formed from fiber materials, and wherein a main fiber direction of the fiber materials of at least two adjoining layers (21.4) of the layered element are different from one another.

19. The watercraft according to claim 17, wherein the hydrofoil region has a discontinuous cross-sectional profile.

20. The watercraft according to claim 17, wherein the hydrofoil region (21.2) includes at least one layer of material applied to a core component (21.5) having two sides, a modulus of elasticity of the core component being different than a modulus of elasticity of the at least one layer of material.

21. The watercraft according to claim 17, wherein each of the first adjustment unit and the second adjustment unit (22, 32) has an actuator (23, 33) which imposes a load in the loading direction during adjustment.

22. A watercraft having a hull (10) with a stern (12) and a bow (11), a first hydrofoil arrangement (30) at the stern (12) and a second hydrofoil arrangement (20) at the bow (11), the first hydrofoil arrangement (30) including a plurality of first hydrofoils (31) and the second hydrofoil arrangement (20) including a plurality of second hydrofoils (21),
  wherein the plurality of second hydrofoils includes a first hydrofoil (21) positioned on a first side of hull (10) and a second hydrofoil (21) positioned on a second side of the hull (10) opposite the first side,
  wherein the plurality of first hydrofoils includes a third hydrofoil (31) positioned on the first side of the hull (10) and a fourth hydrofoil (31) positioned on the second side of the hull (10),
  wherein the first hydrofoil arrangement (30) is coupled to a first adjustment unit (32), wherein the first adjustment unit is associated with each of the plurality of first hydrofoils, the first adjustment unit having a first actuator for vertical adjustment of each first hydrofoil such that the first hydrofoil arrangement (30) is at least partially individually height-adjustable, and the second hydrofoil arrangement (20) is coupled to a second adjustment unit (22), wherein the second adjustment unit is associated with each of the plurality of second hydrofoils, the second adjustment unit having a second actuator for vertical adjustment of each second hydrofoil such that the second hydrofoil arrangement (20) is at least partially individually height-adjustable, wherein the first adjustment unit and the second adjustment unit are connected to the hull (10) via a lever mechanism, and
  wherein at least one of (a) each of the first hydrofoil and the second hydrofoil is individually and independently height-adjustable or (b) each of the third hydrofoil and the fourth hydrofoil is individually and independently height-adjustable;
  the watercraft further comprising a boat drive (13) positioned on the hull (10) and an actuating unit (41), wherein the boat drive (13) includes a marine propeller (13.1) or a jet propulsion mechanism, and at least a part of the boat drive (13) is vertically adjustably connected to the hull (10), wherein the actuating unit (41) is moved in a synchronized manner with at least one of the first adjustment unit or the second adjustment unit, in order to achieve stable positioning of the hull (10) under a variety of operating and load conditions; and an engine mount (42) including the actuating unit (41) which forms a guide having at least one non-linear guide receiving slot (43) or a guide having two non-parallel linear guide receiving slots (43).

\* \* \* \* \*